US011425179B2

(12) United States Patent
Demange et al.

(10) Patent No.: US 11,425,179 B2
(45) Date of Patent: *Aug. 23, 2022

(54) DISTRIBUTED MEDIA CONTENT TRANSFER AND ACCESS MANAGEMENT

(71) Applicant: ViaSat, Inc., Carlsbad, CA (US)

(72) Inventors: Christopher J Demange, San Diego, CA (US); Andrew D Tirella, Cambridge, MA (US); Kevin B Rennie, Encinitas, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,816

(22) Filed: Jan. 15, 2021

(65) Prior Publication Data

US 2021/0144188 A1    May 13, 2021

Related U.S. Application Data

(62) Division of application No. 15/980,666, filed on May 15, 2018, now Pat. No. 10,951,673.

(51) Int. Cl.
*H04L 65/612* (2022.01)
*G06F 16/40* (2019.01)
(Continued)

(52) U.S. Cl.
CPC .......... *H04L 65/4084* (2013.01); *G06F 16/40* (2019.01); *H04L 65/605* (2013.01); *H04L 67/2842* (2013.01); *H04N 21/433* (2013.01)

(58) Field of Classification Search
CPC ............... H04L 65/4084; H04L 65/605; H04L 67/2842; G06F 16/40; H04N 21/433
See application file for complete search history.

(56) References Cited

U.S. PATENT DOCUMENTS 6,810,527 B1    10/2004    Conrad et al.
7,984,190 B2    7/2011    Rhoads
(Continued)

FOREIGN PATENT DOCUMENTS

EP    2634743 A1    4/2013
WO    2016/130476 A1    8/2016
WO    2017020017 A1    2/2017

OTHER PUBLICATIONS

Global Eagle Entertainment, Connected Solutions Product Overview, 2014.
(Continued)

*Primary Examiner* — Joseph L Greene
(74) *Attorney, Agent, or Firm* — Chang & Hale LLP (57) ABSTRACT

A method of managing media content on a vehicle comprises storing a media content library comprising a plurality of media content items in non-volatile data storage media disposed in the vehicle, storing access rule data in the non-volatile data storage media, establishing a connection with a remote computing device over a communication link, receiving, from the remote computing device over the communication link, an indication identifying a first subset of the media content library to be designated as active, updating the access rule data to indicate that the first subset of the media content library is designated as active, and presenting at least a portion of the first subset of the media content library on a media presentation device based at least in part on said updating.

18 Claims, 5 Drawing Sheets

(51) Int. Cl.
  *H04L 65/60* (2022.01)
  *H04L 67/568* (2022.01)
  *H04N 21/433* (2011.01)

(56) References Cited

U.S. PATENT DOCUMENTS

| | | | |
|---|---|---|---|
| 8,762,047 B2 | 6/2014 | Sterkel et al. | |
| 2005/0256616 A1 | 11/2005 | Rhoads | |
| 2010/0138582 A1* | 6/2010 | Bird | H04L 65/60 710/303 |
| 2010/0162325 A1* | 6/2010 | Bonar | H04N 21/4184 725/76 |
| 2010/0262509 A1* | 10/2010 | Delia | G06Q 10/02 705/26.1 |
| 2010/0064327 A1 | 11/2010 | Lynch et al. | |
| 2017/0026676 A1 | 1/2017 | Watson et al. | |
| 2017/0126622 A1 | 5/2017 | Haak et al. | |
| 2017/0223080 A1 | 8/2017 | Velayudhan et al. | |
| 2017/0302711 A1 | 10/2017 | Velayudhan et al. | |
| 2018/0007148 A1* | 1/2018 | Nielsen | H04L 67/306 |
| 2018/0020042 A1 | 1/2018 | Couleaud et al. | |
| 2018/0027036 A1* | 1/2018 | Watson | H04B 7/18506 709/219 |
| 2018/0027037 A1* | 1/2018 | Watson | H04L 67/2842 709/219 |
| 2018/0063121 A1 | 3/2018 | Demange et al. | |
| 2018/0270607 A1 | 9/2018 | Niles | |
| 2019/0037372 A1 | 1/2019 | Girard et al. | |
| 2019/0052914 A1 | 2/2019 | Anderson | |

OTHER PUBLICATIONS

Axinom CMS for the Aerospace Industry, https://cms.axinom.com/industries/aerospace/, 2017.
International Search Report and Written Opinion for PCT/US2019/030689 dated Jul. 18, 2019.

* cited by examiner

DISTRIBUTED MEDIA CONTENT TRANSFER AND ACCESS MANAGEMENT

CROSS-REFERENCE TO RELATED APPLICATIONS

The present application is a divisional of application Ser. No. 15/980,666, filed May 15, 2018, entitled "Distributed Media Content Transfer and Access Management," the entire disclosure of which is expressly incorporated by reference herein.

BACKGROUND

The present disclosure relates to communications systems, and more particularly to media content transfer and management.

The maintenance and updating of media content stored on vehicles such as aircraft can involve the transfer of large amounts of data, and can require extensive data storage and/or communication network resources.

SUMMARY

In some implementations, the present disclosure relates to a personal electronic device comprising a wireless communication interface, non-volatile data storage media, and control circuitry communicatively coupled to the wireless communication interface and the non-volatile data storage media. The control circuitry is configured to establish a first connection with a remote media content management server over a first communication network, receive at least a portion of a media content item from the media content management server over the first communication network, temporarily store the at least a portion of the media content item in the non-volatile data storage media, establish a second connection with a network access terminal of a media delivery system associated with a vehicle over a second communication network using the wireless communication interface, transfer the at least a portion of the media content item from the non-volatile data storage media to the media delivery system over the second communication network using the wireless communication interface, and after said transferring the at least a portion of the media content item, delete the at least a portion of the media content from the non-volatile data storage media. In some embodiments, the at least a portion of the media content comprises encrypted media.

The control circuitry may be further configured to transmit an indication to the media content management server indicating an amount of data storage of the non-volatile data storage media that is available for temporary storage of media content from the media content management server. In certain embodiments, the control circuitry is further configured to obtain an indication that the at least a portion of the media content item is desired for transfer to a media delivery system associated with another vehicle, maintain the at least a portion of the media content item in the non-volatile data storage media for a period of time after said transferring the at least a portion of the media content item in response to the indication, and transfer the at least a portion of the media content item from the non-volatile data storage media to the media delivery system associated with the other vehicle. Deleting the at least a portion of the media content from the non-volatile data storage media may be performed after said transferring the at least a portion of the media content to the media delivery system associated with the other vehicle.

The control circuitry may be further configured to determine that the personal electronic device has unused network capacity at a first period of time, wherein said transferring the at least a portion of the media content item is performed at least in part during the first period of time based on the determination that the personal electronic device has unused network capacity. In certain embodiments, the control circuitry is further configured to, after said deleting the at least a portion of the media content from the non-volatile data storage media, notify the media content management server that the portion of the media content has been deleted.

In some implementations, the present disclosure relates to a media content management server comprising non-volatile data storage media storing a media content library comprising media content items, association data associating users with personal electronic devices, and itinerary data indicating vehicles that the users are scheduled to travel on. The media content management server further comprises a network interface and control circuitry configured to identify a first user scheduled to travel on a vehicle based on the itinerary data, determine a first personal electronic device of the first user based on the association data, and provide a first portion of content of the media content items to the first personal electronic device over a first network using the network interface to allow for local transferring of the first portion of content by the first personal electronic device to a content delivery system of the vehicle over a second network when the first user is onboard the vehicle.

In some embodiments, the non-volatile data storage media stores license data indicating associations between the media content item and the vehicles, and the control circuitry is further configured to determine a subset of the media content items that is associated with a vehicle based on the license data, wherein the first portion of the media content items comprises a portion of the subset of the media content items. The control circuitry may be further configured to determine the subset of the media content items that is associated with the vehicle at least in part based on a comparison of current content items stored in the content delivery system of the vehicle and content items intended to be stored on the vehicle.

The control circuitry may be further configured to provide a second portion of content of the media content items to the content delivery system of the vehicle over a third network. In certain embodiments, the control circuitry is further configured to transmit a request to the first personal electronic device requesting access to data storage of the first personal electronic device. In certain embodiments, the control circuitry is further configured to receive an indication from the first personal electronic device over the first network indicating an amount of storage that is usable for temporary storage of the first portion of content, and identify the first portion of content based on the indicated amount of storage.

In certain embodiments, the control circuitry is further configured to identify a second user scheduled to travel on the vehicle based on the itinerary data, determine a second personal electronic device of the second user based on the association data, and provide a second portion of content of the media content items to the second personal electronic device over the first network using the network interface. At least some of the first portion of content may be part of the second portion of content. In certain embodiments, the control circuitry is further configured to, when said local transferring of the first portion of content by the first personal electronic device to the content delivery system of the vehicle over the second network is unsuccessful, transfer the first portion of content to the content delivery system of the vehicle over a third network.

In some implementations, the present disclosure relates to a content delivery system for a vehicle. The content delivery system comprises non-volatile data storage media configured to store a media content library, a network access terminal, and a media content server. The media content server comprises control circuitry configured to establish a connection with a first personal electronic device over a first network using the network access terminal, receive a first portion of content from the first personal electronic device over the first network, store the first portion of content in the non-volatile data storage media, receive a request for access to a content item of the media content library associated with the first portion of content from a media presentation device, and provide at least part of the first portion of content to the media presentation device in response to the request.

The control circuitry may be further configured to receive a second portion of content from a remote media content management server over a second network. In certain embodiments, the control circuitry is further configured to determine that the first portion of content is valid prior to said storing the first portion of content in the non-volatile data storage media. In certain embodiments, the control circuitry is further configured to receive an indication from a remote source over a second network indicating that a subset of the media content library is designated as active, identify at least a portion of the subset of the media content library as active based on the indication, and cause the at least a portion of the subset of the media content to be presented on a display of the media presentation device. The control circuitry may be further configured to restrict access to media of the media content library that is not designated as active. In certain embodiments, the control circuitry is further configured to obtain an indication of the presence of the first personal electronic device, wherein said receiving the first portion of the content from the first personal electronic device is performed in response to said indication. In certain embodiments, the media presentation device comprises one of a personal electronic device and a seatback media unit.

In some implementations, the present disclosure relates to a method of delivering media content on a vehicle. The method comprises, by control circuitry of an onboard media delivery system installed in a vehicle, establishing a connection with a first personal electronic device disposed within the vehicle over a first network using a network access unit of the onboard media delivery system, receiving a first portion of content from the first personal electronic device over the first network, storing the first portion of content as part of a media content library in a non-volatile data store disposed within the vehicle, receiving a request for access to a content item of the media content library associated with the first portion of content from a media presentation device disposed within the vehicle, and providing at least part of the first portion of content to the media presentation device in response to the request.

The method may further comprise receiving a second portion of content from a remote media content management server over a second network, and storing the second portion of content as part of the media content library in the non-volatile data store. In certain embodiments, the method further comprises establishing a connection with a second personal electronic device disposed within the vehicle over the first network, receiving a second portion of content from the second personal electronic device over the first network, and storing the second portion of content as part of the media content library in the non-volatile data store, wherein said providing the at least a portion of the media content library comprises providing the first portion of content together with the second portion of content to the media presentation device. In certain embodiments, the method further comprises establishing a connection with a remote computing device over a second network, receiving, from the remote computing device over the second network, an indication indicating a subset of the media content library that is designated as active, updating metadata to indicate that the subset of the media content library is designated as active, and presenting at least a portion of the subset of the media content library that is designated as active on the media presentation device based at least in part on said updating.

In some implementations, the present disclosure relates to a method of managing media content on a vehicle. The method comprises, by control circuitry of an onboard media delivery system installed in a vehicle, storing a media content library comprising a plurality of media content items in non-volatile data storage media disposed in the vehicle, storing access rule data in the non-volatile data storage media, the access rule data indicating, for each of the plurality of media content items, whether the respective media content item is designated as active, establishing a connection with a remote computing device over a communication link, receiving, from the remote computing device over the communication link, an indication indicating a first subset of the media content library to be designated as active, updating the access rule data to indicate that the first subset of the media content library is designated as active, and presenting at least a portion of the first subset of the media content library on a media presentation device based at least in part on said updating.

In certain embodiments, the method further comprises maintaining a second subset of the media content library in the non-volatile data storage media after said receiving the indication, wherein the updated access rule data indicates that the second subset of the media content library is designated as inactive. The method may further comprise restricting access to the second subset of the media content library.

In some implementations, the present disclosure relates to a media management system for a vehicle. The media management system comprises non-volatile data storage media configured to store a media content library comprising a plurality of media content items, and access rule data, the access rule data indicating, for each of the plurality of media content items, whether the respective media content item is designated as active. The media management system further comprises a network access terminal, and a media content server, the media content server comprising control circuitry configured to establish a connection with a remote computing device over a communication link, receive, from the remote computing device over the communication link, an indication indicating a first subset of the media content library is designated as active, update the access rule data to indicate that the first subset of the media content library is designated as active, and present at least a portion of the first subset of the media content library on a media presentation device based at least in part on said updating. In certain embodiments, the non-volatile data storage media is further configured to store a second subset of the media content library in the non-volatile data storage media, and the updated access rule data indicates that the second subset of the media content library is designated as inactive. The control circuitry may be further configured to restrict access to the second subset of the media content library.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

The headings provided herein are for convenience only and do not necessarily affect the scope or meaning of the claimed invention. In certain implementations, the present disclosure relates to systems, devices and methods for transferring media content to onboard media management systems of vehicles, as well as managing access to thereto.

Aircraft and other vehicles often store media content libraries for the purpose of providing entertainment and/or other content or resources for passengers. Generally, media content stored on a vehicle, such as an aircraft, may be subject to periodic content updating processes. For example, such processes may be implemented weekly, monthly, quarterly, or according to some other schedule. In some implementations, when an onboard media content library maintained in a vehicle becomes expired, or replacement thereof is desired for some reason, the onboard media content library may be replaced, at least in part. For example, the onboard media content library may be replaced with an entirely new catalog in some situations. The new or updated library may have some overlap content with the previous library in some instances.

The updating of media content on a vehicle may be implemented using various types of digital content transfer, such as directly to the vehicle over a communication network (e.g., Internet connection via satellite or other wireless hardware and/or communication protocol), or through physical media exchange. For example, one or more data storage drives storing media content may be physically removed and swapped or exchanged with one or more substitute data storage drives or media devices. In order to implement physical data storage device exchange, it may generally be required for the drives/devices to be pre-loaded with the updated media content and carried or otherwise physically transported onto the vehicle. Due to the amount of content stored on such physical drives/devices, the drives/devices may be relatively large and/or cumbersome to transport or load in the vehicle's media management system, making physical exchange of data storage drives undesirable and labor intensive in some contexts.

In addition, the use of media content on vehicles may be governed at least in part by certain media license or access rules, which may govern, at least in part, the rights to access the media content. The term "access rules" may refer to any data structure identifying or indicating which media content items are designated as active and/or inactive, as described in more detail below. Such access rules may be for a particular term or period of time, and may indicate the terms under which particular content items may be viewed and/or accessed in accordance with the relevant license agreement(s). In some implementations, access rules indicate, such as on a monthly basis, that certain media content items will become active at a certain point in time, whereas certain other media content items may become inactive at such point in time. As volumes of media content become more expansive, it may be desirable for the licensing windows to likewise become shorter in order to accommodate the relatively frequent updating and/or modification of media content and/or associated licensing/access rules. As described in more detail below, the systems and methods described herein utilize access rules to permit such frequent updating. This is in contrast to the use of physical storage drive exchange to update media content, where it may be difficult for such exchanges to be implemented with the necessary frequency and/or timing precision dictated by relatively shorter access or licensing windows.

Active content stored in an onboard media content library of a vehicle may be made visible to passengers under certain conditions. The term "active" refers to media content that is available for selection, distribution or presentation to passengers of a vehicle at a given time. For example, active media content items may be content that is licensed or otherwise permitted for distribution or presentation to passengers by the media system of the vehicle. Furthermore, active media content items may include certain content that is public domain content, or other freely accessible content not requiring specific license or authorization, wherein such content is stored in the media content library of the vehicle and is designated as available for distribution or presentation by the media system of the vehicle. Similarly, the terms "inactive" and "deactivated" may be used to refer to media content or content items that are stored in the onboard media content library of a vehicle, but are not designated for distribution or presentation to passengers of the vehicle at a given time. For example, inactive content may be content that is not licensed or authorized at a given time, and therefore access to such content may be restricted at least in part through designation as inactive/deactivated. As another example, inactive content may be content that is licensed or authorized, but may nevertheless be made unavailable for selection distribution or presentation due to its designation as inactive. As referenced above, in some implementations, inactive media content items may be removed from the onboard media content library and/or data storage of a vehicles media system. However, for reasons outlined above, content removal processes that involve the manual swapping-out of data storage drive(s)/device(s) can prove relatively costly and/or time-consuming. Therefore, in some situations, it may be desirable for media content updating to be performed over a network, wherein such content is transferred from a remote media server media content library. However, in view of the relatively large amounts of data that may be involved with content updating in a vehicle media system, the costs associated with network-based transfer of updated content may be undesirable or prohibitive in some situations. Furthermore, the amount of time to load such large volumes of data can be problematic. In some implementations, hundreds of gigabytes, or more, of data may be exchanged during a single media content update.

Media Content Management System

Figure 1:
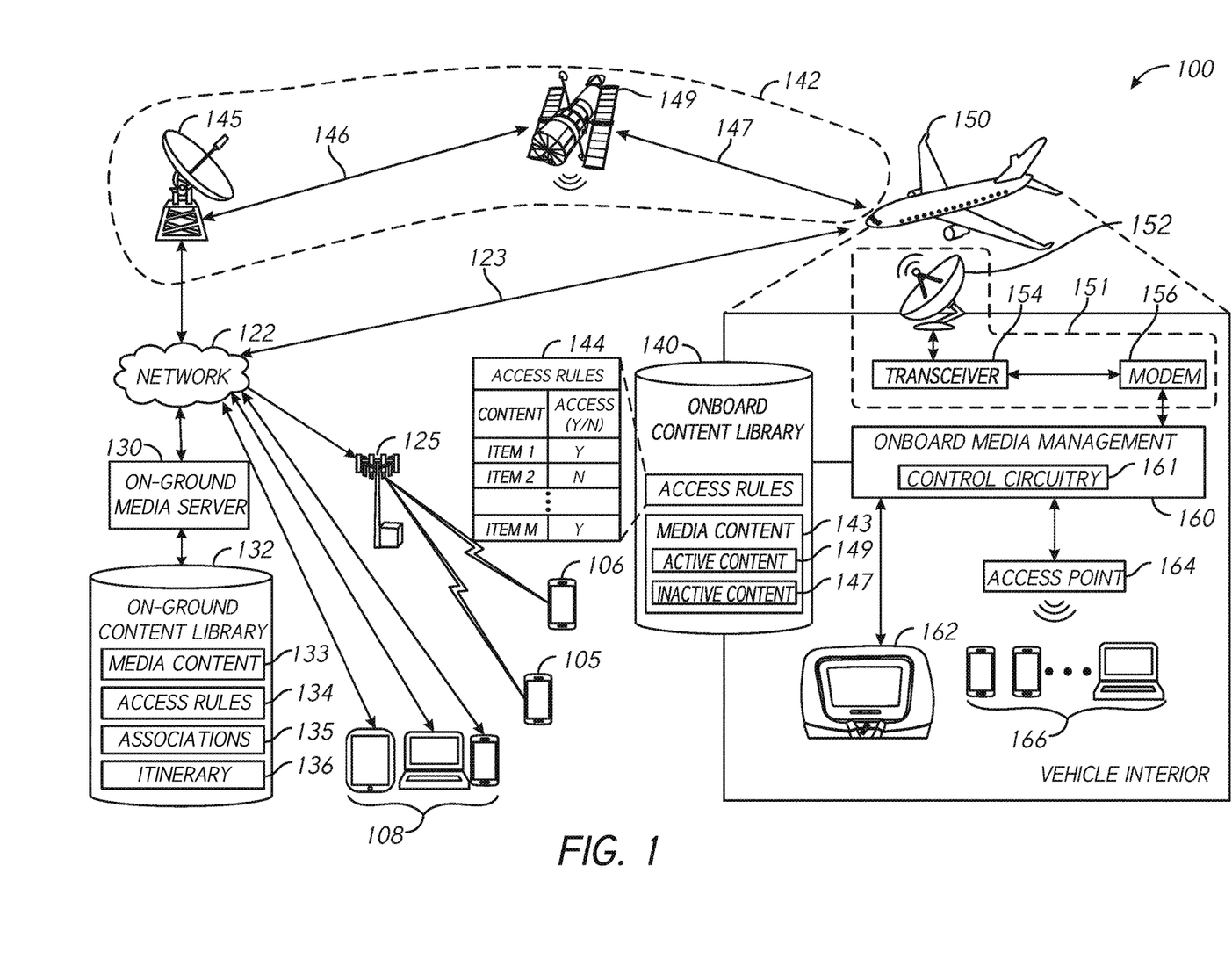
FIG. 1 illustrates a system for updating an onboard media content library and/or associated media access rules associated with a vehicle in accordance with one or more embodiments.

In some implementations, the present disclosure provides systems, methods, and devices that provide for remotely and/or automatically managing access and/or updates to media content stored in a vehicle media system substantially without requiring manual physical data storage drive/device swapping or exchange. FIG. 1 illustrates a system 100 for updating an onboard media content library 140 and/or associated media access rules 144 associated with a vehicle 150 in accordance with one or more embodiments.

The system 100 includes an onboard media management system 160, which may be installed in, and/or disposed on or in, a vehicle 150, such as an aircraft, cruise ship, automobile, or the like. Although certain embodiments are disclosed herein in the context of aircraft, or other vehicles, it should be understood that the principles disclosed herein may be applicable to any suitable or desirable mobile platform or vehicle. The onboard media management system 160 may be associated with an onboard media content library 140, which may be configured to store certain media content items 143 as part of a content library. The onboard media content library 140 may include both active media content items 149 and inactive media content items 147, as described in detail herein. The media content items 143 may comprise any type of media content files or data structures, as well as any type of media, including movies, shows, other types of video files, audio files, news or text content, or the like. The onboard media management system 160 may be configured to make accessible the active media content 149 to provide, with respect to aircraft-based embodiments, in-flight entertainment to passengers onboard the aircraft. Such entertainment content may be viewable by the passengers using various electronic devices, such as vehicle-integrated media presentation devices 162 (e.g., seatback media presentation devices), and/or other electronic devices that may be viewable by passengers. For example, passengers may have personal electronic devices (referred to herein as "PEDs"), which may be configured to connect with the onboard management system 160 in order to receive media therefrom.

In some implementations, the present disclosure allows for the offsetting of at least part of the content-uploading burden associated with updating the onboard media content library 140 to personal electronic devices (e.g. personal electronic device 105). For example, personal electronic devices (e.g., personal electronic device 105) may comprise control circuitry and/or data storage configured to store relatively small chunks of one or more media content items that may be initially loaded thereon when the personal electronic device is not physically located onboard the vehicle, wherein the stored media content may be subsequently transferred to the onboard media management system 160 when the personal electronic device is brought onto the vehicle 150 and/or in proximity thereto. In some embodiments, validation process(es) may be performed by the onboard media management system 160 to validate the media content stored by the personal electronic device prior to uploading the same. The uploading of the stored media content on the personal electronic device may be performed at least partially automatically upon connecting to an onboard communication network. The storing and transferring of relatively small chunks of media content to personal electronic devices, followed by the uploading thereof from personal electronic devices to onboard media management systems, may be considered "distributed" content updating or transfer, as described in detail herein.

With further reference to FIG. 1, the system 100 may provide for the periodic updating of the onboard media content library 140 associated with the vehicle 150 through various mechanisms. For example, in certain embodiments, the updating of the onboard media content library 140 is performed at least in part over a network connection external to the vehicle 150, such as through a satellite network connection 142 and/or another type of network connection 123 with the Internet or other network 122 (e.g., Wi-Fi or other network connection). In addition, the updating of the onboard media content library 140 may further be performed partly through distributed content updating using personal electronic devices carried onto the vehicle 150, as referenced above. The network 122 can be any type of network and can include, for example, one or more of: The Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. Furthermore, the network 122 can include both wired (e.g., copper and optical) and wireless (e.g., radio and microwave) connections.

In some implementations, relatively smaller batches or chunks of media content may be transferred from the on-ground media server 130 to the vehicle 150 over wide-area network connections, such as Internet connections using the satellite network 142, a cellular network connection, a Wi-Fi network connection, and/or the like. Such smaller batches/chunks may include, for example, complete or partial copies of movies, television shows, music, movie trailers or other promotional features, newsfeeds, such as daily newsfeeds, or the like. For such purposes, the vehicle 150 may comprise a cellular modem (e.g., 4G, GSM, CDMA, LTE, etc.), Wi-Fi modem, satellite modem, or the like. When the vehicle comes within the range of a wireless network gateway, the onboard media management system 160 may be transferred at least part of a content update package from the on-ground media server 130 over, for example, the Internet or other wide area network. For example, for aircraft embodiments, when the aircraft lands and comes within a wireless network gateway range associated with an airport or terminal thereof, at least some of the content update may be transferred over a local area network connection, such as Wi-Fi connection or the like. Additionally or alternatively, the satellite network 142 may be used to transfer at least part of the content update. For example, the satellite 149 may be used to provide at least partial content updates to one or more aircraft or other vehicles. For example, the satellite communication system 142 may use trickle-feeding mechanisms or processes to provide update content to the vehicle 150. For example, while the vehicle (e.g., aircraft) is traveling and passes through satellite beams that have relatively less utilization, content may be passed to the vehicle 150, whereas when the vehicle is physically located in more congested beams, less or no content may be passed over the satellite connection. The capacity of a respective beam may be balanced with the number of vehicles located within the beam to determine a desired bandwidth utilization for transferring update content to the directly vehicle 150.

The system 100 further comprises an on-ground media server 130 that is configured to remotely manage the transferring of media content 133 stored in an on-ground content library data store 132 to the onboard media content library 140 of the vehicle 150. For example, the on-ground media server 130 may implement such media content transfer through the use of personal electronic devices (105, 106, 108, 166) of passengers and/or crewmembers scheduled to travel on the vehicle 150. To aid in the understanding of the description herein, different reference designators (105, 106, 108) are used for personal electronic devices that have not yet been brought onboard and/or in proximity of the vehicle 150, than the reference designator (166) used once the personal electronic devices have been brought onboard and/or in proximity of the vehicle. Thus, the different reference designators may be used to represent the same personal electronic device at different instances of time. The transfer of media content between the on-ground server 130 and the personal electronic devices (105, 106, 108) is described in further detail with respect to the system 200 of FIG. 2, which illustrates a system 200 for distributing media content data to a personal electronic device 205. The on-ground media server 130 may provide various types of media content items, such as linear media content items (e.g., linear audio and/or video media), such content that are scheduled for delivery at a certain time (e.g., a television show run at a set time, etc.). For example, various broadcast television channel offerings may be available from the on-ground media server 130. The on-ground media server 130 may advantageously additionally or alternatively provide non-linear media content (e.g., video on demand), which may be available on-demand to electronic devices onboard the vehicle 150 (e.g., electronic devices 166) to the extent that such content is active and/or authorized. The on-ground media server 130 may include one or more media servers, media storage devices, etc., as well as other data stores.

With further reference to FIG. 1, the onboard media management system 160 of the vehicle 150 is configured to implement content delivery to passengers of the vehicle. The onboard media management system 160 may be communicatively coupled to, or associated with, an access point 164, which may serve as a network access terminal for connecting with personal electronic devices 166 associated with passengers of the vehicle over a network connection, such as a Wi-Fi or other wireless connection.

The vehicle 150 may comprise a network access terminal 151 for establishing a connection with an external access network, such as a satellite network, cellular network, or other network. The network access terminal 151 comprises one or more of an antenna 152, a transceiver 154, and a modem 156, for facilitating network communications. The antenna 152 may be in communication with the transceiver 154, which may be in communication with the modem 156. The wireless access point 164 may be in communication with the onboard media management system 160 and/or other network access components (not shown). The onboard electronic devices 166 may comprise control circuitry configured to execute one or more applications that provide an interface for users/passengers on the vehicle 150 to obtain and/or consume media content items of the onboard media content library 140; the user may have the option to select/request one or more media content items from the interface.

The network access terminal 151 installed in the vehicle 150 can provide for reception of a forward downlink signal from satellite access network 142 including a satellite 149 and a gateway 145, as well as transmission of a return uplink signal to the satellite-based access network using the satellite 149 and the gateway 145. Such features may support two-way data communications between the various electronic devices within the vehicle 150 and the terrestrial network 122. The network access terminal 151 may further provide connectivity between the onboard media management system 160 and the on-ground media server 130 via the satellite 149 and gateway 145. The gateway 145 may also be in data communication with the network 122, and thereby to the on-ground media server 130.

The electronic devices 162, 166 disposed within the vehicle 150 can include any type of personal electronic devices 166 (e.g., smartphones, laptops, tablets, netbooks, and the like) brought onto the vehicle 150 by passengers, as well as passenger seat back systems 162 or other devices on the vehicle 150. The electronic devices 162, 166 can be configured to communicate with the onboard media management system 160 via a communication link that can be wired and/or wireless. The communication link can be, for example, part of a local area network, such as a wireless local area network (WLAN) supported by the wireless access point (WAP) 164. One or more access points 164 can be distributed about the vehicle 150, and can, in conjunction with the media management system 140, provide traffic switching and routing functionality; for example, as part of a WLAN extended service set (ESS), etc.

Passengers on the vehicle may interface with the onboard media management system 160 in any suitable or desirable way. For example, media content may be presented to passengers using electronic displays of personal electronic devices 166 associated with the passengers, such as through a web browser application or the like, or using an interface associated with a vehicle-integrated media system, such as the seatback media system 162. The onboard media management system 160 may serve as a media delivery system and/or content server for providing media content for presentation using the personal electronic devices (e.g., PED 166) and/or presentation systems associated with the vehicle 150 (e.g., seatback media presentation devices or systems 162).

The onboard media content library 140 comprises non-volatile data storage media. Such data storage media may include any type or amount of data storage, including magnetic media, optical media, solid-state media, and/or the like. The media content 143 comprises the current media content items stored in the content delivery system of the vehicle 150. The onboard media content library 140 may store the access rules 144, which may comprise data indicating content distribution rights and/or other content access authorization parameters for the media content 143. For example, the access rules 144 may define media content distribution regions and/or windows of time within which the media content item may or may not be presentable to passengers. The access rules 134 may also be maintained in the on-ground media server 130, or on a separate device in data communication with the on-ground media server 130 and/or onboard media management system 160. The access rules 144 data may be stored in one or more tables, or any other type of data structure(s).

The access rules 144 may be defined in any suitable or desirable way. For example, media access rules/parameters may be based on user information associated with the user requesting a media content item. Such user information may be related to the carrier (e.g., airline) or provider of the media content. As yet another example, the access rules 144 may include rules specific to a particular vehicle (e.g., a particular aircraft) and/or the source and/or destination of the vehicle.

With respect to the vehicle 150 and/or personal electronic devices 105, 106, 108, 166, the on-ground server 130 may represent a remote media content management server. Although referred to herein as an on-ground server, the media server 130 may be physically disposed and/or situated in any physical location; use of the term "on-ground" herein is for simplicity and convenience to indicate that the media server 130 is not disposed on the vehicle 150, but rather external thereto at some location. The on-ground media server 130 may be understood with respect to the on-ground media server 230 of FIG. 2, which may constitute an example embodiment of the on-ground media server 130 of FIG. 1. With respect to FIG. 1, media content items can be obtained from the on-ground content server 130 via the network 122 and/or the on-ground terminal 145 or other terrestrial stations, gateways, or other network nodes, or the like.

Figure 2:
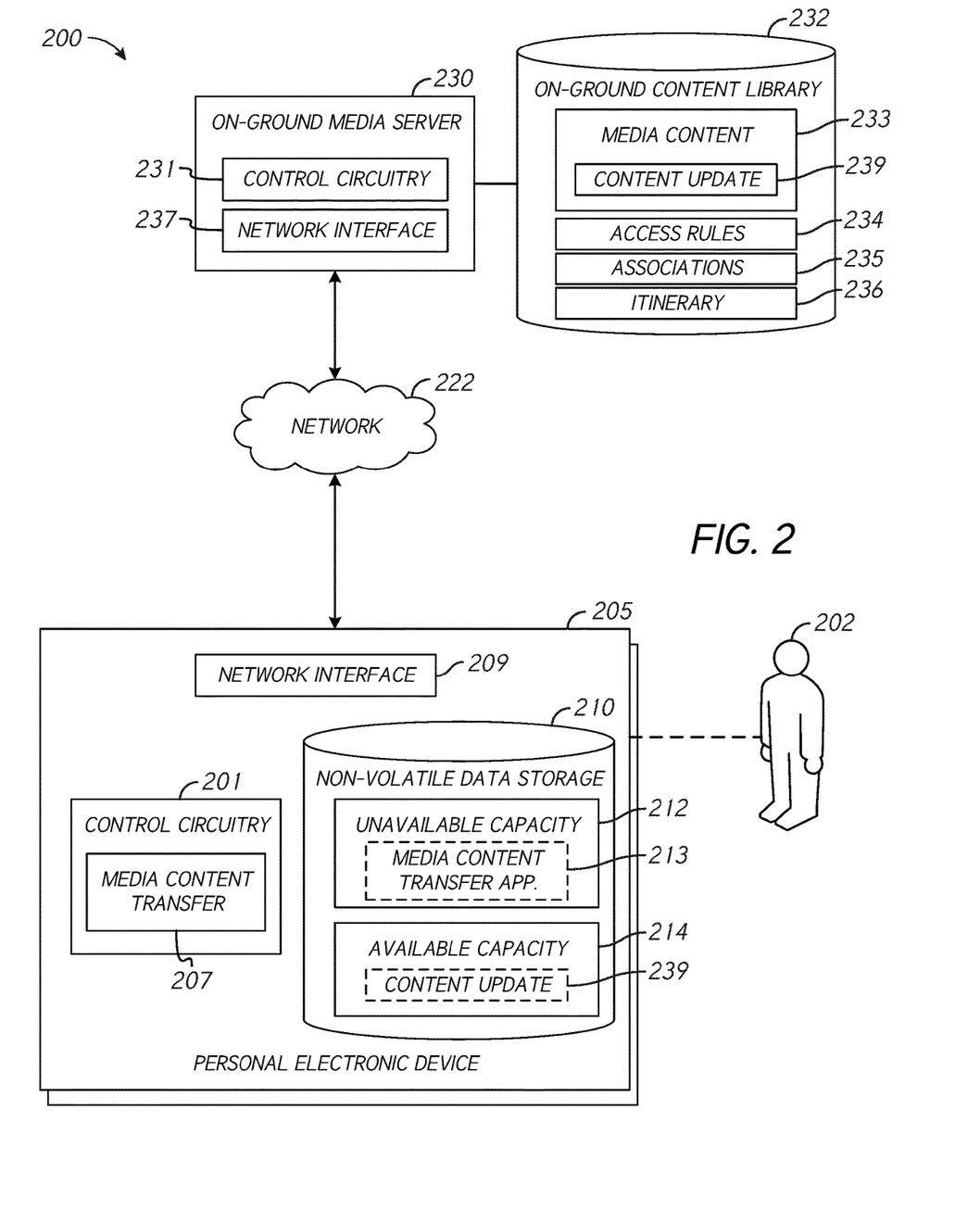
FIG. 2 illustrates a system for transferring media content between an on-ground media server and a personal electronic device in accordance with one or more embodiments.

With reference to FIG. 2, the on-ground media server 230 may comprise control circuitry 231, which may be used to determine or acquire information relating to what media content of the on-ground content library 232 is to be added to a particular vehicle (e.g., the vehicle 150 of the system 100 described above). Furthermore, the on-ground media server 230 may acquire or maintain information indicating trips associated with the vehicle (e.g., flights) that a given individual/passenger is scheduled to take. Such information may be referred to herein as "itinerary data" 236. The on-ground media server 230 may further maintain, such as in the data storage media 232 of the on-ground content library, association data 235, which may include data indicating associations between users/passengers and personal electronic devices. For example, where a first user 202 is scheduled to travel on a vehicle at a certain time, or for a certain flight or trip, as indicated by the itinerary data 236, the on-ground media server 130 may use the association data 235 to determine a personal electronic device 205 belonging to or otherwise associated with the user 202. Therefore, based at least in part on the itinerary data 236 and/or association data 235, the on-ground media server 230 may be configured to determine that the personal electronic device 205 is scheduled to travel on a particular vehicle at certain time or for a certain trip or flight.

In some implantations, the itinerary data 236 comprises crew schedule information indicating what crews or individuals are assigned to work or otherwise travel on a particular flight or trip of a vehicle. The association data 235 may include information associating crewmembers with personal electronic devices, such as company assigned computers, smart phones, and/or tablets.

Once one or more of the personal electronic devices (e.g., PED 205) have been identified as being scheduled to travel on a particular vehicle, the on-ground media server 230 may be configured to, using the control circuitry 231 and/or network interface 237 thereof, transfer media content, such as content update data 239, to the personal electronic device 235 for storage thereon. That is, shards, chunks, or other portions of media content that are desired to be transferred to the target vehicle may be encrypted and provided to the personal electronic device 205 and/or other identified personal electronic device(s). The portions of media content provided to the personal electronic device 205 by the on-ground server 230 may be stored in nonvolatile data storage 210 of the personal electronic device 205. For example, as shown, the media content 239 may be stored in the available capacity, partition, or portion 214 of the nonvolatile data storage 210 of the electronic device 205. Subsequently, when the passenger 202, along with his or her personal electronic device 205, boards the target vehicle, the personal electronic device 205 may upload the content 239 to the onboard media management server (not shown) of the vehicle.

For convenience, some of the following description and examples are described in the context of a media management system of an aircraft vehicle. However, it should be understood that the concepts and principles described in the following description are applicable to any type of vehicle or system. According to one example, an airline that manages a fleet of aircrafts may rely on an on-ground media server and/or other components or entities to update media content of the onboard content librar(ies) of one or more aircraft of the fleet, wherein it is desired that the update is to be completed within a certain window of time (e.g., two weeks). The on-ground media server 230 may maintain data indicating the desired media content for one or more aircraft of the fleet, or for the entire fleet. The on-ground media server 230 may further be provided the media content that is intended to be updated to the fleet or aircraft. The on-ground server 230 may perform certain quality and/or authorization checks, such as by inspecting metadata and/or media content, to validate or authorize the media content intended for updating to the fleet. The on-ground media server 230 may then initiate a publication of the update content 239 to the desired aircraft. The on-ground content library 230 comprises nonvolatile data storage media storing a plurality of media content items 233, as well as association data 235 associating users with personal electronic devices, itinerary data 236 indicating vehicles (e.g., aircraft) that various users are scheduled to travel on, and/or license data or access rules 234 indicating associations between the media content items 233 and aircraft that indicate which aircraft are authorized or licensed to use or present certain content.

The control circuitry 231 of the on-ground media server 230 may be configured to determine a subset of media content items 233 that is associated with a particular vehicle or aircraft based on the access rules/license data 234. That is, the content update 239 may represent a subset of the media content 233 that is desired for transfer to one or more aircraft or vehicles. With respect to one or more media content items of the media content 233, no license may be required for use or presentation thereof. For example, some content may be free, or open-source, content that is not subject to licensing rules. Although the content update 239 is described as being a subset of the media content 233 in some embodiments, the media content that is transferred to the personal electronic device 205 and/or distributed among a plurality of personal electronic devices, or otherwise transferred to a vehicle, may comprise the entire media content library 233. In such cases, it may not be necessary for the on-ground media server 230 to rely on the access rules 234 to determine what content to provide to a particular vehicle.

With further reference to FIG. 2, the personal electronic device 205 includes a network interface 209, such as a wireless communication interface, and control circuitry 201 coupled to the wireless communication interface 209. Prior to travel on a vehicle (e.g. aircraft), the personal electronic device 205 may establish a connection with a communication network 222, such as a terrestrial network (e.g., cellular network). The on-ground server 230 may facilitate temporary storage of one or more content items or portions thereof, identified in FIG. 2 as the content update data 239, in an access-controlled manner in the nonvolatile data storage 210 of the personal electronic device 205. For example, the content update data 239 may be stored in the nonvolatile data storage 210 in an encrypted format. Once onboard the target vehicle, the content update data 239 can be automatically transferred from the personal electronic device 205 to the onboard server that is associated with the target vehicle via an access point, such as the access point 164 of the system 100 described above in connection with FIG. 1.

In certain embodiments, the on-ground media server 230 and/or personal electronic device 205 may be configured to implement the transfer of the content item(s) 239 between the on-ground media server 230 and the personal electronic device 205 during a period of time in which the network used by the personal electronic device 205 has sufficient or unused network capacity or bandwidth. In some embodiments, the on-ground media server 230 may be configured to distribute the desired content for updating to the target vehicle across a plurality of personal electronic devices, wherein relatively smaller chunks or portions of data may be transferred to individual personal electronic devices, thereby improving efficiency and/or utilization of available resources.

In some implementations, users of personal electronic devices may be incentivized in some way to allow the on-ground media server 230 to utilize portions of the personal electronic devices' respective nonvolatile data storage. For example, the user 202 of the personal electronic device 205 may be provided access to certain media content onboard a vehicle or otherwise, and/or any other additional or alternative incentives, such as goods or services of value and/or special access to content, or the like. The personal electronic device may maintain code or application data 213 designed to implement media content transfer functionality when executed. Such code may be embedded in, or part of, a software application used to interface with the relevant airline or other transportation company/entity. With respect to crew member users of personal electronic devices, the content stored in the nonvolatile data storage of personal electronic devices associated therewith may be dynamically updated and/or modified to reflect the content desired for each of the respective vehicles on which the crew member sequentially rides.

In some embodiments, the control circuitry 201 of the personal electronic device 205 may be configured to transmit an indication to the media server 230 indicating an amount of data storage of the nonvolatile data storage 210 that is available or permissible for temporary storage of the content update data 239.

The network 222 may comprise a wide area network, such as the Internet. Therefore, the communication link between the personal electronic device 205 and the on-ground media server 230 may be achieved over the Internet or other wide area network. Distributed media content transfer in accordance with the present disclosure may provide certain advantages over prior art content update systems. For example, distributed content transfer in accordance with the present disclosure may provide improved convenience, cost-effectiveness, and/or resource utilization when compared to the exclusive use of direct transmission of content items from the on-ground media server 230 to onboard media servers/delivery systems of vehicles over, for example, satellite networks or other network connections used to transmit data to and from vehicles (e.g., aircraft) directly.

With respect to directly transmitting content items to a vehicle from an on-ground media server via an external communication link, such as a satellite network connection, such transfer may compete with other data transfer needs of the vehicle served by such network, which may prevent or impede and acceptable user experience from being provided. For example, such other data transfer needs may involve requests for data from passengers currently onboard the vehicle or aircraft.

Personal electronic devices may belong to different passengers and/or crew members scheduled to travel on a vehicle. In certain embodiments, the data transfer to the different personal electronic devices may occur over different networks and/or at different times. Since each personal electronic device may store a relatively small amount (e.g., hundred megabytes) of the overall data intended for transfer to the onboard server of the vehicle (e.g., hundreds of gigabytes), distributed media content transfer in accordance with the present disclosure may provide the data storage and/or network resource demands to be distributed among a plurality of network connections and/or electronic devices, such that the impact on any individual network connection or electronic device may be relatively reduced or minimized. Furthermore, in some implementations, the data transfer from the on-ground media server to the respective personal electronic devices may be performed using a "trickle" data transfer process or capability, which may utilize unused capacity of a network when such capacity may otherwise be idle, and therefore the impact on network bandwidth may be negligible or reduced. For example, a trickle transfer process may be implemented that transfers data only when capacity is available after all other traffic has been transmitted. In such a case, the distributed data transfer of the selected media content item(s) may be a lower priority than other traffic delivered via a wireless communication link or other network connection. In contrast, the real-time transfer of media content items via a network communication may be at a higher priority than the distributed pre-loading of media content.

In some implementations, data transfer of content update data to personal electronic devices is performed when the personal electronic devices are connected to a local area network (e.g., Wi-Fi), which may further reduce the impact to the terrestrial (e.g., cellular) network connection 222. That is, the transfer by the on-ground media server 230 of the content update data 239 to the personal electronic device 205 may advantageously be scheduled or implemented only when the personal electronic device is connected to a Wi-Fi network or the like.

Media Content Transfer/Management Processes

Figure 3:
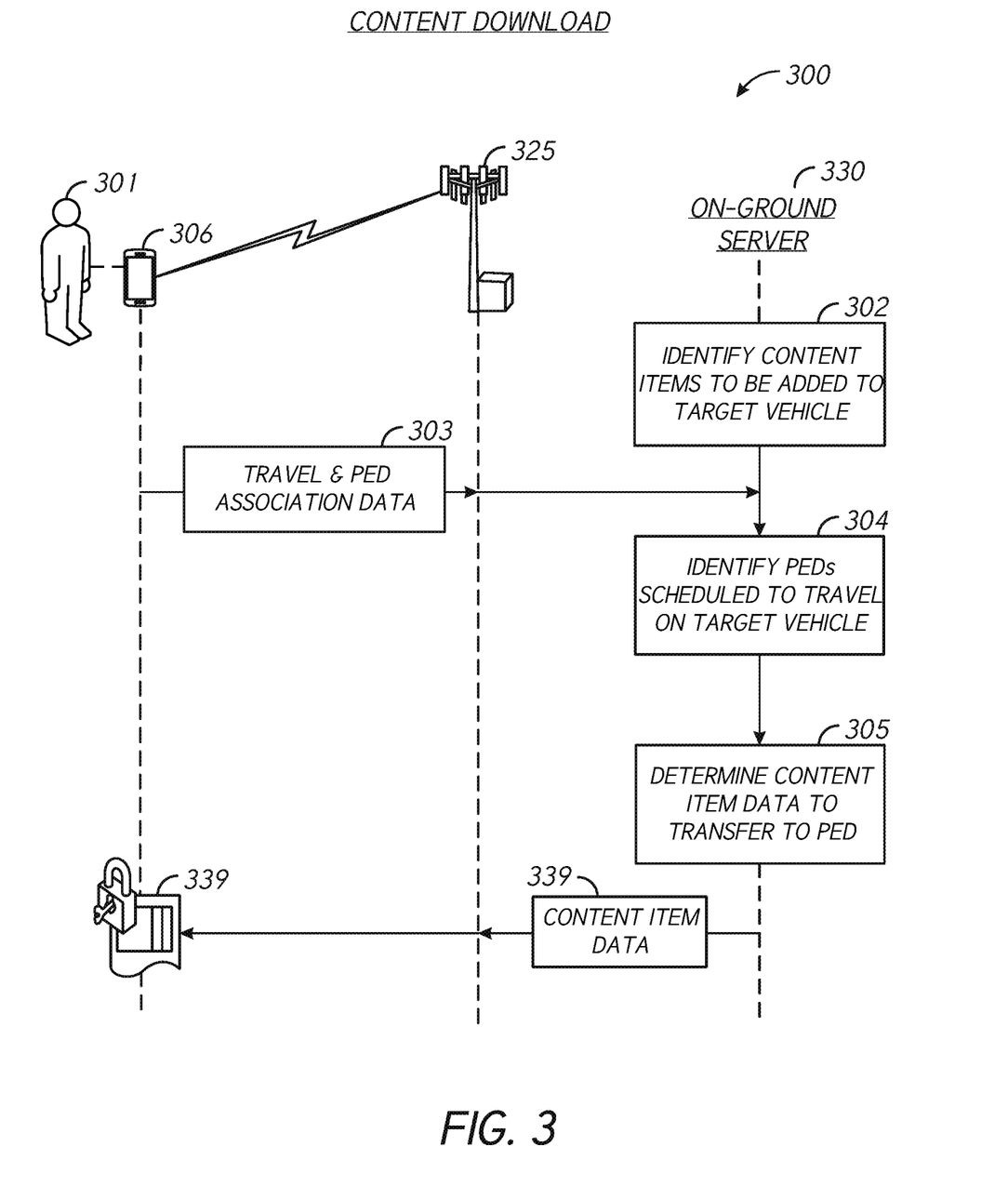
FIG. 3 illustrates a process for transferring media content from an on-ground media server to a personal electronic device in accordance with one or more embodiments.

FIG. 3 illustrates a process 300 for transferring content, such as media content, from an on-ground media server 330 to a personal electronic device 306 in a distributed fashion in accordance with one or more embodiments. The diagram of FIG. 3 illustrates an example time sequence of events that may occur using the disclosed methods and systems. With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

The process 300 may utilize a personal electronic device 306 associated with a passenger or user 301. The process 300 may provide a mechanism for adding content stored at an on-ground server 330 to the onboard media content library of a target vehicle using personal electronic devices of passengers and/or crewmembers scheduled to travel on the vehicle. At block 302, the process 300 involves identifying content items to be added to the target vehicle, which may be performed at least in part by control circuitry of the on-ground server 330. Content items may be identified/selected for transfer to the vehicle at least in part by comparing one or more tables or metadata identifying content items currently stored on the vehicle with one or more tables or metadata identifying content items that are desired to be stored on the target vehicle or aircraft. For example, a subset of the available media content items maintained by the on-ground server 330 may be identified/selected or generated based on the differences between the current content items stored in the content delivery system of the vehicle and the content items that are desired to be stored in the content delivery system of the vehicle.

The process 300 further involves, at block 304, identifying personal electronic devices that are scheduled to travel on the target vehicle or aircraft. The on-ground server 330 may identify the personal electronic devices of passengers scheduled travel on the target vehicle in any suitable or desirable manner. In some embodiments, a given personal electronic device 306 is determined to be associated with a given passenger 301 prior to boarding the target vehicle for travel. For example, the passenger 301 may be prompted, such as via an application interface displayed on the personal electronic device 306, to associate him- or herself with his or her personal electronic device 306. Such process may take place during one or more of the following processes: ticket buying, check-in, waiting to board the vehicle, or other period of time or event associated with the travel. The on-ground server 330 may identify the personal electronic device 306 based on data 303 provided by the user 301 to the on-ground server 330, which may include certain travel information and/or personal electronic device association information linking the personal electronic device 306 to the passenger 301. Such data 303 may be provided to the on-ground server 330 over any communication link or network, such as over a cellular network using certain cellular hardware 325 (e.g. cell tower). In some embodiments, identification of PED(s) is based at least in part on the location of the PED(s). For example, the process 300 may involve determining that a PED is currently located in a particular geographical region (e.g., based on geolocation information obtained from the PED, the IP address used by the PED, etc.), wherein selection of the PED for distributed media content transfer is based at least in part on such determination.

In some embodiments, the on-ground server 330 transmits a request to the personal electronic device 306 requesting access to data storage of the personal electronic device 306. For example, the passenger 301 may be prompted with a request or question inquiring whether he or she would be willing to permit the use of their personal electronic device 306 for transferring content item data 339 to the target vehicle. If the passenger 301 provides a negative response, the process 300 may be terminated, whereas if the passenger provides an affirmative response, the process may continue to block 305.

The determination of content item data to transfer to the PED 306 at block 305 may be based at least in part on the location of the PED 306. For example, the process 300 may involve verifying that the PED 306 is physically located in a region in which the content item data is authorized for distribution and/or presentation based on the access rules. The selection or transfer of the content item data to the PED may be based on such verification.

The interaction of the personal electronic device 306 with the on-ground server and/or media management system of the target vehicle may be implemented using an application that is executed by the personal electronic device 306. The application may include a number of features, including one or more of an ability to make a reservation for travel on the target vehicle, purchase a ticket for travel on the target vehicle, and/or obtain status information regarding travel on the target vehicle. In certain embodiments, the application may enable the user 301 to associate his or her electronic device 306 with account credentials the user 301 may have utilized in connection with an authentication or "login" process, such as a registered user name and/or password. The application may also enable the user 301 to select one or more digital communication services for use during travel on the vehicle, such as selection of media content items as described herein. For example, the application may provide an ability for the user 301 to select one or more movies or other media content items (such as streaming music, pod casts, shows, short videos, and the like) for access during travel on the vehicle.

In some embodiments, the passenger 301 may be incentivized in some manner to allow the on-ground server 330 to utilize the data storage of the personal electronic device 306. Such incentives may be of any suitable or desirable form or type. For example, the passenger/user 301 may be permitted access to one or more content items for a certain amount of time before, during and/or after travel on the vehicle; free or discounted network access onboard the vehicle may be provided; free or discounted goods or services on board the vehicle may be provided; advertisement-free viewing of media content may be provided; and/or access to otherwise hidden or unavailable be content may be provided. In embodiments in which crew devices are used to transfer content update data, the crew member devices may be used to store relatively more content than is stored in passenger personal electronic devices, as crew members may have access to more available data storage and/or may be incentivized to a greater degree to assist in the distributed content transfer, and may therefore be more receptive to allowing such usage. Furthermore, the crew members may be associated with personal electronic devices used for storing maps and/or other travel-related data, and such devices may comprise data storage resources that may be further used for content transfer in a distributed fashion in accordance with the present disclosure.

The on-ground server 330 may have access to the vehicle assignment schedule indicating the scheduled travel routes for the particular vehicle (e.g. aircraft). Because the passenger 301 is associated through itinerary data with certain travel, as well as associated with the personal electronic device 306 through association data, the on-ground server 330 may use the vehicle assignment schedule to generate an association between the personal electronic device 306 and the particular vehicle. The on-ground server 330 may use such association to identify the personal electronic device 306 as being available for transferring content to the target vehicle. With respect to crew members, the on-ground server 330 may have access to travel itineraries for respective crew members.

Once the association between the personal electronic device 306 and the target vehicle travel has been made, the on-ground server 330 may provide the content item data 339 to the personal electronic device 306. In some embodiments, the content item data 339 is stored in the personal electronic device 306 as an encrypted media content item 339. The content item 339 may be subsequently uploaded to the target vehicle's media management/delivery system using, for example, a local area network, such as a Wi-Fi connection or the like. By distributing the content data transferred to the vehicle to the personal electronic device 306, the need for direct server-to-vehicle data transfer may be at least partially mitigated. In some embodiments, at least a portion of the desired content to be transferred to the target vehicle may be transmitted over a direct server-to-vehicle connection.

The determining of content item(s) to be provided to the personal electronic device 306 may be performed or implemented in any suitable or desirable way. In some embodiments, the content item 339 may be selected randomly from among the identified content items to be added to the onboard server of the target vehicle. In some embodiments, certain content items may be prioritized, such that they have a higher likelihood of being transferred to the target vehicle than other content items. The manner in which the prioritization is implemented may vary from implementation to implementation. For example, prioritization may be based at least in part on what content items are most commonly viewed or desired for a given route or vehicle. For example, relatively popular genres or titles for a specific route or vehicle may be prioritized over less popular content. In some embodiments, content items that are provided to passengers for payment are given priority over free content. Furthermore, prioritization may be based at least in part on the size and/or data rate associated with certain content items. For example, relatively larger files, such as movie files like, may be prioritized over smaller files. In some embodiments, content item data is selected for distributed transfer based at least in part on the current content items stored on each vehicle that the passenger 301 is scheduled to travel on. For example, if the passenger 301 is scheduled travel on multiple different vehicles, the content item data may be selected from among content items that are desired to be uploaded to multiple, or all, of the different vehicles (e.g., aircraft) that the passenger 301 is scheduled to travel on.

In some embodiments, the user 301 may be able to select the amount of shared storage of the personal electronic device 306 that is available for storing the content item data 339. The process 300 may involve receiving, from the personal electronic device 306 over the cellular or other connection, an indication of the amount of data storage that is usable for temporary storage by the server 330. In some implantations, distributed content transfer in accordance with the present disclosure is implemented only, or primarily, for relatively lower-priority content. At the onboard media management module/system, the media content may be made available for viewing by passengers as the content is gradually updated through the use of distributed personal electronic devices.

In order to account for various contingencies, such as passenger travel plan changes, or the like, the content 339 may be pushed or provided to one or more additional personal electronic devices associated with different passengers scheduled to travel on the target vehicle. Such redundant transfer of the content item data 339, or at least a portion thereof, may increase the probability that the content item data will ultimately successfully be transferred to the onboard server of the vehicle. In some implementations, the on-ground server 330 may attempt to transfer the content item 339 to the personal electronic device 306, wherein, if the transfer to the personal electronic device is unsuccessful, the on-ground server 330 may attempt transfer to the target vehicle through other means, such as through direct transfer to the target vehicle. Direct transfer of media content to a vehicle may be implemented using one or more suitable communication system(s), including any suitable communication link or system, such as one or more of: a satellite communication system, an air-to-ground communication system, a hybrid satellite and air-to-ground communication system, a cellular communication system, and/or others as are known by those of skill in the art. Because of the mobile nature of vehicles (e.g., vehicle 150 of FIG. 1), the communication system used for transfer of content to a target vehicle may advantageously involve at least one wireless communication link, such as the aforementioned examples.

Figure 4:
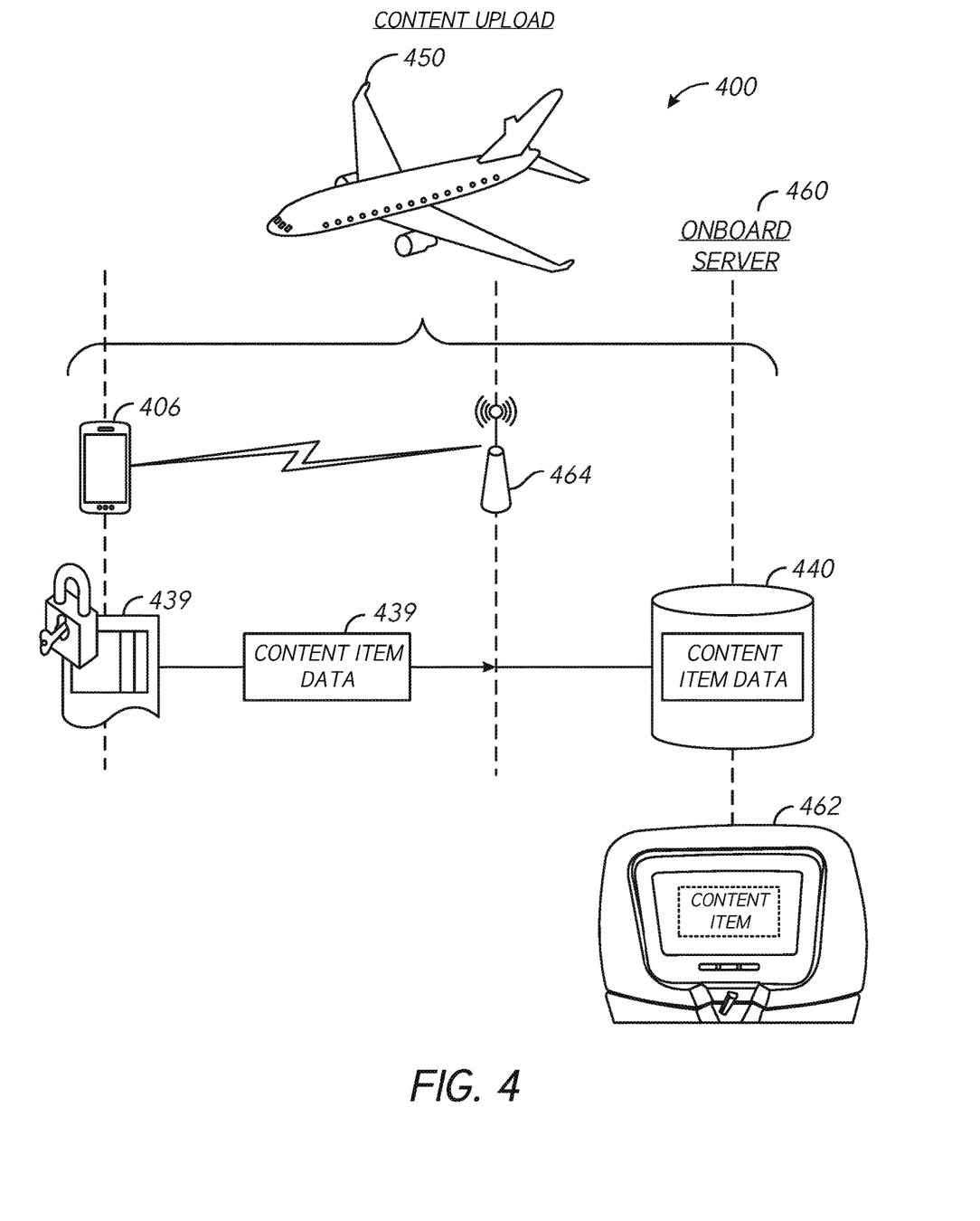
FIG. 4 illustrates a process for transferring media content to a media management server of a vehicle using a personal electronic device in accordance with one or more embodiments.

FIG. 4 illustrates a process 400 for transferring media content to an onboard media management system or server 460 of a vehicle 450 using a personal electronic device 406. Although identified as an onboard server 460 in FIG. 4, it should be understood that the onboard media management server 460 may be any type of onboard media management or/delivery system. The process 400 may be a continuation of the process 300 shown in FIG. 3 and described above. For example, the personal electronic device 406 may correspond to the personal electronic device 306 in FIG. 3, wherein the personal electronic device 406 may have stored thereon content item data 439 received from an on-ground server. The content item data 439 may be stored on the personal electronic device 406 in an encrypted format.

When the personal electronic device 406 and/or associated passenger (not shown) boards the vehicle 450, the device 406 may connect to the onboard server 460 via an access point 464. For example, the access point 464 may provide a wireless access point for connecting to a local area network in the vehicle 450. Once connected to the network, the personal electronic device 406 may transfer the stored content item data 439 to the onboard server 460. The connection with the access terminal 464 and/or uploading/transferring of the content item data 439 to the onboard server 460 may be performed automatically in response to one or more events. For example, when connected to the network, the personal electronic device 406 may automatically initiate transfer of the content item data 439. In some implementations, the onboard server 460 is configured to detect the presence of the personal electronic device 406, either by physically detecting the presence through some presence sensor or other mechanism, or by detecting that the personal electronic device 406 has connected to the network through the access point 464. In some embodiments, the personal electronic device 406 may notify the onboard server 460 of its presence onboard the vehicle 450, which may trigger and/or initiate certain responsive actions, such as initiation of content transfer from the personal electronic device to the onboard server 460.

The onboard server 460 may store the content item data in data storage media as part of an onboard media content library 440. In some embodiments, the onboard server 460 may validate the content item data 439 before or after storing the contents in the onboard media content library 440. In addition, the onboard server may perform validation with respect to the personal electronic device 406 prior to, or subsequent to, transfer of the content item data. If the transfer of the content item data 439 to the onboard server 460 is unsuccessful for any reason, such as due to hardware and/or software malfunction, or due to the failure of the passenger associated with the personal electronic device to board the vehicle, the content item data may be acquired through an alternate transfer mechanism, such as over a satellite connection, or the like.

Once the content item data 439 has been transferred to the onboard server 460, the content item data may be deleted from the personal electronic device 406. If another vehicle also requires the content item data, the data may not be deleted from the personal electronic device 406 immediately subsequent to transfer therefrom to the onboard server 460. For example, the onboard server 460 and/or personal electronic device 406 may determine that at least a portion of the media content item 439 is desired for upload to a media delivery system associated with another vehicle. That is, either or both of the personal electronic device 406 and the onboard server 460 may receive or obtain an indication that the media content item 439 is desired for upload to another vehicle. In some embodiments, the onboard server 460 may instruct the personal electronic device 406 in some manner to maintain storage of the content item data 439 thereon after upload to the onboard media content library 440.

In some embodiments, the on-ground server 330 (FIG. 3) is configured to request or otherwise cause the content item data (339, 439) to be deleted from the personal electronic device (306, 406) prior to transfer of the content item data to the onboard media content library 440. For example, the on-ground server 330 may cause the content item data to be deleted based at least in part on a physical location of the electronic device (306, 406), such as based on a determination that the electronic device is at a location where use of the content item data is not authorized. In some embodiments, the on-ground server 330 may cause the content item data to be deleted from the personal electronic device (306, 406) after a predetermined time period has elapsed. In some embodiments, deleting of the content item data from the personal electronic device may occur or be caused substantially automatically based on one or more conditions, such as location or the elapsing of a period of time. Deleting of the media content item data prior to transfer to the onboard media content library 440 may be directed by either the on-ground server 330, the personal electronic device (306, 406), or both.

The various techniques and mechanisms described herein for transferring content data to the vehicle 450 via the personal electronic device 406 and/or one or more additional personal electronic devices (not shown) may also be used in conjunction with other techniques and mechanisms for transferring content data to a vehicle, such as an aircraft. In some embodiments, the distributed data transfer to the vehicle 450 via the personal electronic device(s) may represent a best-effort approach, wherein certain media content data that is unable to be transferred in a distributed manner using personal electronic devices is directly transferred to the aircraft over a satellite or other network connection. For example, the process 400 may involve determining (e.g., by the on-ground server 330) the media content that has successfully been transferred to the onboard media content library 440, and further determining a portion of media content that is desired to be transferred to the media content library that still remains to be transferred. Based on the determination of the remaining media content data to be transferred, the on-ground server may initiate the transfer of the remaining media content through a direct communication link to the vehicle 450, such as over a satellite link. The determination of what media content data has been successfully transferred to the onboard media content library 440 may be made by the on-ground server 330 by querying the onboard server 460. In some embodiments, the personal electronic device 406 is configured to send a confirmation to the on-ground server 330 indicating whether transfer of the content item data 439 to the onboard media content library 440 was successful. The determination of the remaining media content data to be transferred to the onboard media content library 440 may be made at, or with respect to, a particular period of time in which the media content is desired to be stored on the onboard media content library 440. For example, if a media content update is to be completed at a point in time, at or near the point in time, the on-ground server may determine the remaining media content not yet stored at the onboard media content library 440, and initiate a direct transfer of the remaining media content at or around that time.

The media content transferred to the vehicle 450 may be transferred to the vehicle prior to explicit request for access to such content by a passenger or other user or system, and/or may be transferred to the vehicle in response to a request by the passenger for the content item data that is not currently stored in the onboard media content library.

In some embodiment, at least a portion of the media content (e.g., the content item data 439) stored in the onboard media content library 440 may be desired for transfer to another vehicle. In such situations, the desired media content may be pushed from the vehicle 450 to the other vehicle. The pushing of the media content from the vehicle 450 to the other vehicle may be made by directly transferring the content between vehicles (e.g., via a WiFi or other wireless connection when the vehicles are in a common physical area), or by utilizing one or more personal electronic devices of passengers scheduled to travel on the other vehicle and pushing the desired content to the personal electronic devices for subsequent upload to the other vehicle.

Although various embodiments are disclosed herein in the context of transfer of media content between personal electronic devices and onboard media content libraries, it should be understood that the principles disclosed herein are applicable to the transfer of other types of data between personal electronic devices and onboard systems. For example, in some embodiments, an onboard system may be configured to transfer diagnostic or other data relating to the vehicle to personal electronic devices travelling on the vehicle, wherein the transferred diagnostic or other data is later transferred to a remote server (e.g., the on-ground server 330) after the passenger associated with the personal electronic device has exited the vehicle.

Remote Media Content Access Management

An onboard media content server for a vehicle, such as an aircraft, as described above in connection with FIG. 1, may store certain license and/or access rules or data associated with content items stored in the content library of the vehicle. Such rules may indicate whether or not a given content item is accessible and/or licensed for viewing by passengers or other users. That is, the onboard media content library may store inactive media content items that are not currently authorized for, or made available to, passengers or other users. Such content access rules maintained by the onboard media management system may be updated sporadically or periodically. In some implementations, the present disclosure relates to systems and methods for remotely updating such content access rules, such as from a remote on-ground server, to thereby provide remote activation or deactivation of content stored in the onboard media content library of a vehicle to passengers or other users.

Figures 5, 6:
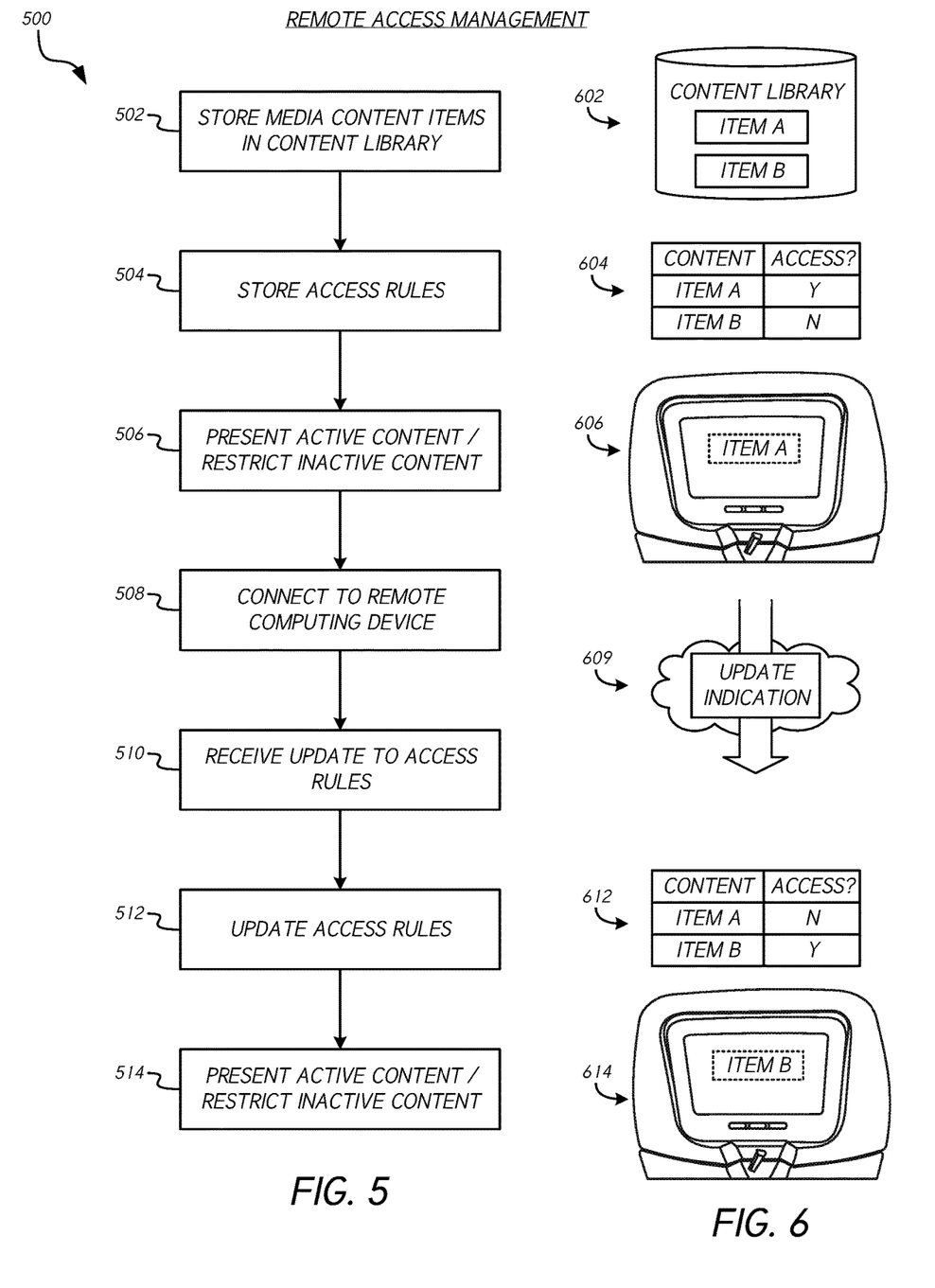
FIG. 5 illustrates a process for remotely managing access rules for an onboard media management system of a vehicle in accordance with one or more embodiments.
FIG. 6 illustrates components of an onboard media management system corresponding to various stages of the process of FIG. 5 in accordance with one or more embodiments.

FIG. 5 illustrates a process 500 for remotely managing access rules for an onboard media management system of a vehicle in accordance with one or more embodiments. FIG.

6 illustrates various components of an onboard media management system corresponding to various stages of the process 500 in accordance with one or more embodiments. The process 500 may allow for relatively quick and/or efficient updating of content available to passengers on a vehicle by allowing for the remote activation and/or deactivation of content already stored in a content library maintained in data storage 602 onboard the vehicle. In connection with the process 500, deactivated content may be placed into an idle state, rather than deleted from the onboard media content library 602, thereby providing the benefit of avoiding and/or limiting costs and/or other limitations associated with the adding and/or deleting of content in connection with content library updates. For example, a given content item that is currently deactivated may be activated in response to transmission of a command from a remote source, which may provide a more efficient mechanism for updating content in a content library compared to transmitting an entire copy of the given content item in real time.

As shown in FIG. 6, the content library 602 of an onboard media management system may store plurality of content items (Item A, Item B). The process 500 involves, at block 502, storing the media content items in the onboard media content library. This step 502 may be performed at any point in time. The process 500 further involves, at block 504, storing access rules at the onboard media management system of the vehicle. Although embodiments are disclosed herein in which access rules are maintained onboard the vehicle, it should be understood that, in some implementations, the access rules are not stored locally onboard the vehicle, but rather accessed (e.g., by the onboard media management system) when necessary from a remote location. As shown in FIG. 6, the access rules may comprise metadata, such as table data, indicating whether individual content items are active and accessible for presentation to passengers.

At block 506, the process 500 involves presenting active content and/or restricting presentation of inactive content to passengers or other users. For example, as shown in FIG. 6, such active content may be presented using a seatback media presentation device, or any other media presentation device or system.

At block 508, the process 500 involves connecting to a remote computing device, such as an on-ground media server or other computing device or system. Over the remote connection, the process 500 involves, at block 510, receiving updated access rule information. For example, an indication may be received, as shown at stage 609 of FIG. 6, indicating items of the content library 602 that are to be identified as active and/or inactive or deactivated.

At block 512, the process 500 involves updating the stored or maintained access rules to reflect the remotely provided update indication. For example, as shown at stage 612 of FIG. 6, the update indication may result in the access rules indicating that certain previously active items are now inactive, while certain previously inactive items are now active.

At block 514, the process 500 involves presenting the newly activated content and/or restricting the newly inactivated or deactivated content, as reflected in the illustrated stage 614 of FIG. 6.

Deactivated content may be effectively placed into an idle state, rather than deleted from the content library 602, which may advantageously allow for relatively quick and efficient updates to reactivate the previously deactivated content, such that transfer of the content to the onboard media content library may not be necessary since it will already be stored in the content library when activation is desired.

Remote activation and/or deactivation of content may at least partially reduce the burden of transferring large amounts of data to and/or from the onboard media management system. Furthermore, by storing both active and inactive content, the onboard media management server may be able to manage the content library to make accessible to passengers and other users only the amount of content that the system is authorized to present.

The process of FIGS. 5 and 6 may allow for the preloading of a media management systems with large amounts of media content, wherein such library may be remotely managed to selectively present media content to passengers. Inactive content may be maintained on the data storage of media management server, but reflect a new content state that is idle, such that it is not available for presentation to users. Such mechanisms may minimize the amount of loading and/or deleting of content in onboard media management systems.

With respect to distributed content transfer to onboard media management systems associated with vehicles, as described above in connection with FIGS. 1-4, remote access management in accordance with FIGS. 5 and 6 may allow for gradual distributed content transfer using personal electronic devices over extended periods of time, wherein such content may be transferred to a target vehicle prior to such content being active. Such content transfer may be opportunistically implemented in a distributed fashion when possible or available, whereas the activation of such content may only be effective or implemented subsequently when updated access rules allow for such activation. In addition, remote updating of access rules may allow for substantially immediate updating of available or accessible media content in a content library of the vehicle. In some embodiments, the content library 602 comprises data storage providing one terabyte or more of data storage, such as up to 30 terabytes or more. In some implementations, content items may be transferred upon request for a passenger, and maintained in the content library thereafter indefinitely and activated and deactivated as desired remotely.

General Comments

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

Reference throughout this disclosure to "some embodiments," "certain embodiments," or "an embodiment" means that a particular feature, structure or characteristic described in connection with the embodiment can be included in at least some embodiments. Thus, appearances of the phrases "in some embodiments," "in certain embodiment," or "in an embodiment" in various places throughout this specification are not necessarily all referring to the same embodiment, and may refer to one or more of the same or different embodiments. Furthermore, embodiments disclosed herein may or may not be embodiments of the invention. For example, embodiments disclosed herein may, in part or in whole, include non-inventive features and/or components. In addition, the particular features, structures or characteristics can be combined in any suitable manner, as would be apparent to one of ordinary skill in the art from this disclosure, in one or more embodiments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A method of managing media content on a vehicle, the method comprising:
   by control circuitry of an onboard media delivery system installed in a vehicle:
      storing a media content library comprising a plurality of media content items in non-volatile data storage media disposed in the vehicle;
      storing access rule data in the non-volatile data storage media, the access rule data indicating, for each of the plurality of media content items, whether the respective media content item is designated as active or inactive;
      establishing a connection with a remote computing device over a communication link;
      receiving, from the remote computing device over the communication link, an indication identifying a first subset of the media content library to be designated as active during a trip of a vehicle and identifying a second subset of the media content library to be designated as inactive during the trip of the vehicle, wherein the first subset is designated as active based on a geographical region that is associated with a source or destination of the vehicle;
      updating the access rule data to indicate that the first subset of the media content library is designated as active and presentable to all passengers on the vehicle;
      updating the access rule data to indicate that the second subset of the media content library is designated as inactive and not presentable to all passengers on the vehicle; and
      presenting at least a portion of the first subset of the media content library on a media presentation device based at least in part on said updating.

2. The method of claim 1, further comprising maintaining the second subset of the media content library in the non-volatile data storage media after said receiving the indication.

3. The method of claim 2, further comprising restricting access to the second subset of the media content library.

4. The method of claim 1, wherein the first subset is designated as active based on a window of time between a beginning and ending of the trip of the vehicle.

5. The method of claim 1, wherein first subset is designated as active based on the vehicle.

6. The method of claim 1, wherein first subset is designated as active based on a destination of the vehicle.

7. The method of claim 1, wherein first subset is designated as active based on a source of the vehicle.

8. The method of claim 1, wherein the access rule data further indicates terms under which the respective media content item may be accessed in accordance with license data.

9. The method of claim 1, wherein:
the received indication from the remote computing device further identifies a particular point in time at which the first subset of the media content library is to be designated as active; and
the updating the access rule data to indicate that the first subset of the media content library is designated as active is performed at the particular point in time.

10. A media management system for a vehicle, the media management system comprising:
non-volatile data storage media configured to store:
a media content library comprising a plurality of media content items; and
access rule data, the access rule data indicating, for each of the plurality of media content items, whether the respective media content item is designated as active;
a network access terminal; and
a media content server, the media content server comprising control circuitry configured to:
establish a connection with a remote computing device over a communication link;
receive, from the remote computing device over the communication link, an indication identifying a first subset of the media content library to be designated as active during a trip of the vehicle and identifying a second subset of the media content library to be designated as inactive during the trip of the vehicle, wherein the first subset is designated as active based on a geographical region that is associated with a source or destination of the vehicle;
update the access rule data to indicate that the first subset of the media content library is designated as active and presentable to all passengers on the vehicle;
update the access rule data to indicate that the second subset of the media content library is designated as inactive and not presentable to all passengers on the vehicle; and
present at least a portion of the first subset of the media content library on a media presentation device based at least in part on said updating.

11. The media management system of claim 10, wherein the control circuitry is further configured to restrict access to the second subset of the media content library.

12. The media management system of claim 10, wherein the access rule data further indicates a window of time that the respective media content item is designated as active.

13. The media management system of claim 10, wherein the access rule data further indicates terms under which the respective media content item may be accessed in accordance with license data.

14. The media management system of claim 10, wherein the access rule data further indicates a distribution region for the respective media content item.

15. The media management system of claim 10, wherein first subset is designated as active identified based on the vehicle.

16. The media management system of claim 10, wherein first subset is designated as active identified based on a destination of the vehicle.

17. The media management system of claim 10, wherein first subset is designated as active identified based on a source of the vehicle.

18. The media management system of claim 10, wherein:
the received indication from the remote computing device further identifies a particular point in time at which the first subset of the media content library is to be designated as active; and
the control circuitry is further configured to update the access rule data to indicate that the first subset of the media content library is designated as active at the particular point in time.

* * * * *